June 2, 1970  J. VAN SICKLE  3,515,427
AUTOMOBILE GLARE SHIELD
Filed Aug. 1, 1967
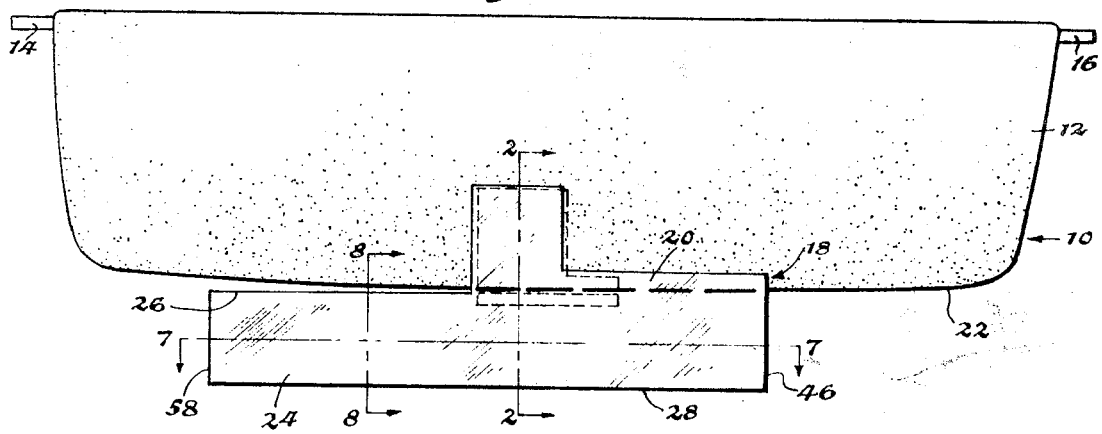
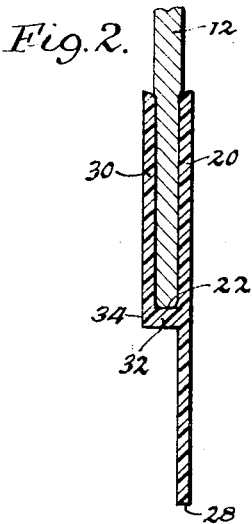 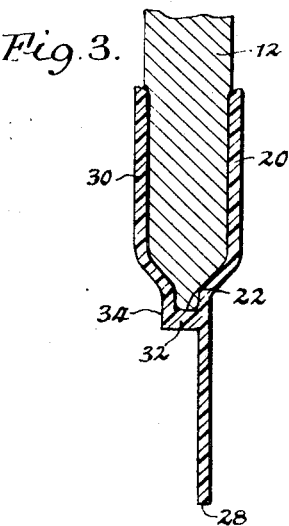
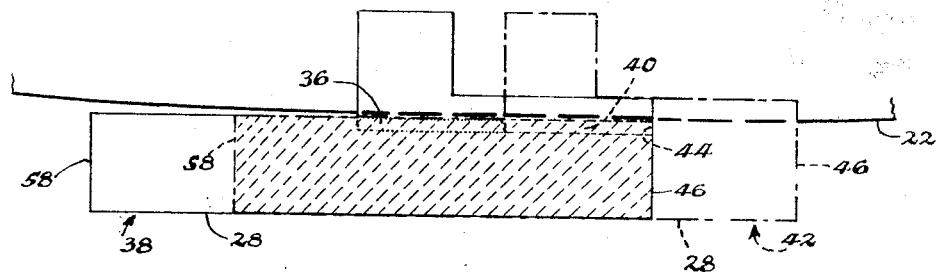
INVENTOR.
John Van Sickle June 2, 1970  J. VAN SICKLE  3,515,427
AUTOMOBILE GLARE SHIELD
Filed Aug. 1, 1967  2 Sheets-Sheet 2
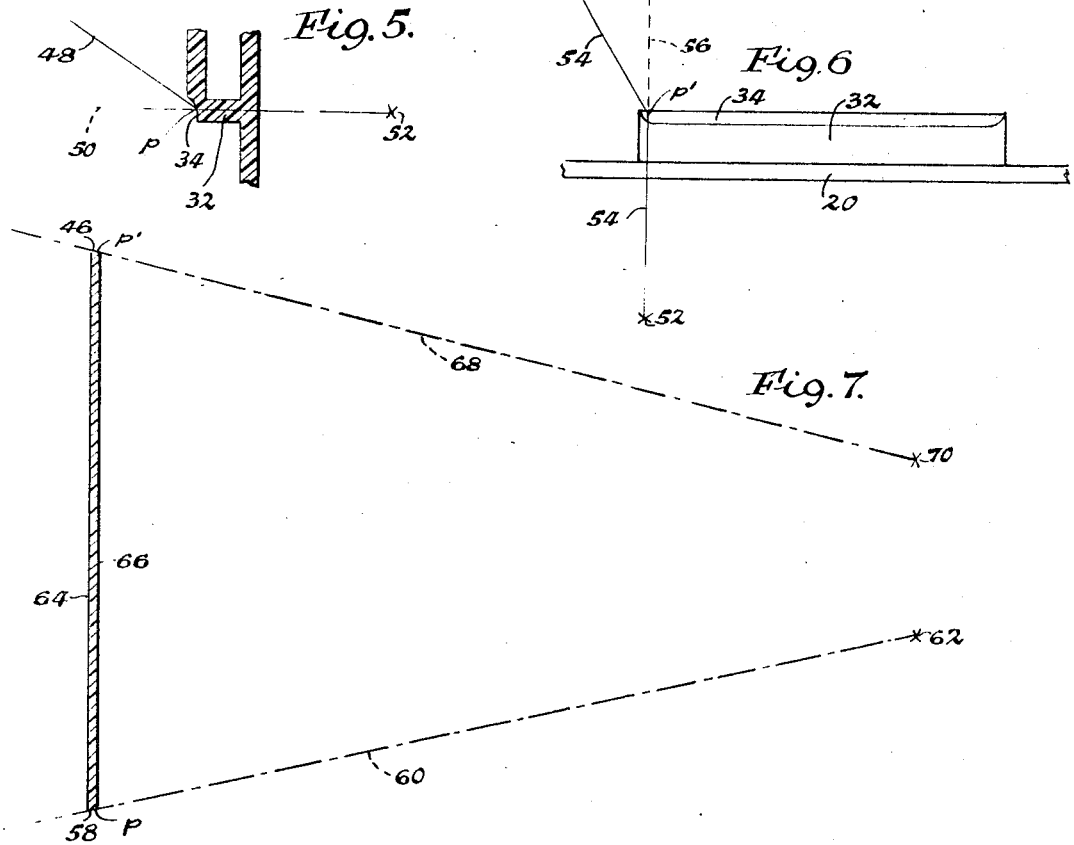
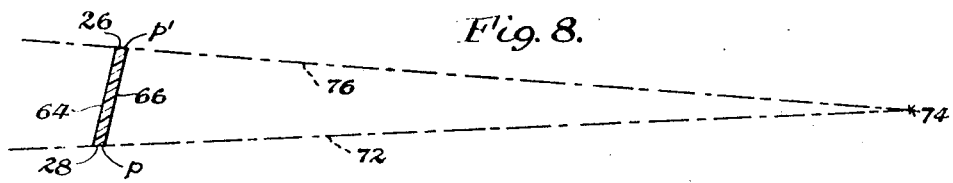
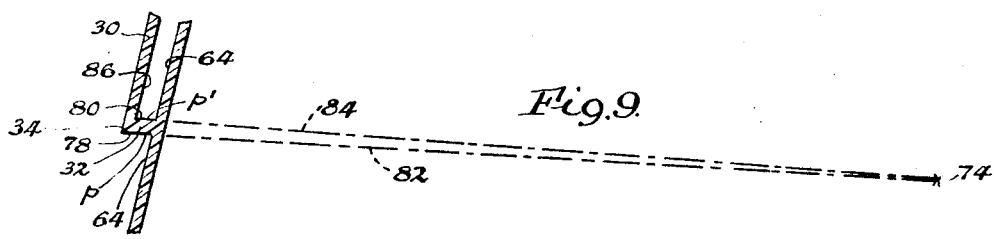
INVENTOR.
John Van Sickle United States Patent Office 3,515,427
Patented June 2, 1970

3,515,427
AUTOMOBILE GLARE SHIELD
John Van Sickle, Elma, N.Y.
(Billington Road, East Aurora, N.Y. 14052)
Filed Aug. 1, 1967, Ser. No. 657,550
Int. Cl. B60j 3/00
U.S. Cl. 296—97                    16 Claims

ABSTRACT OF THE DISCLOSURE

A clip device for attaching an automobile glare shield against an automobile sun visor, such clip device being so constructed that distraction from the images of the clip device as seen by each eye of the operator of the motor vehicle will be minimized. Also, a construction of the clip device to bring into view overhead traffic lights obscured by the sun visor. In addition, an improved construction of the edges of the body of the shield below the bottom edge of the sun visor eliminates distraction from the image of such edges.

The clip device is provided with an abutment member, extending outwardly from the body of the shield below the bottom edge of the sun visor, which abutment member connects the arm of the clip device with the body of the shield and positions the shield against the bottom edge of the sun visor, such abutment member, under the present invention, having a horizontal length which is preferably compatible with the interpupillary distance of the operator, so that the images of the abutment member, as seen by the separate eyes of the operator, will be contiguous, thereby reducing the visual distraction caused by the abutment member.

Also, under the present invention, the abutment member has a horizontal distance from the edge of the shield inward to the car equal to the interpupillary distance of the operator, so that the edge inward to the car of the image of the abutment member as seen by the eye of the operator outward to the car will fall on the edge inward to the car of the image of the shield as seen by the eye of the operator inward to the car, thus eliminating the visual distraction which would occur if the said edge of the said image of the abutment member were to fall on either side of the said edge of the said image of the shield.

Further, the abutment member is made of transparent material and, under the present invention, is given a flat outer surface parallel to the body of the shield below the bottom edge of the sun visor, so that the abutment member appears to the operator as a transparent area or window, thus further reducing the visual distraction caused by the abutment member.

Alternatively, the outer surface of the abutment member is made concave so as to bring into view traffic lights which otherwise might be obscured by the sun visor when the vehicle is close to the traffic light.

In addition, under the present invention, the edges of the shield below the bottom edge of the sun visor are beveled so as to be in line with the eyes of the operator, thus eliminating the images of such edges. The edges of the abutment member are also beveled to be in line with the eyes of the operator so as to eliminate the images of such edges.

The foregoing improvements relate to the glare shield described in U.S. Pat. No. 3,195,946 which was issued to the present inventor on July 20, 1965.

BRIEF DESCRIPTION OF FIGURES OF DRAWING

FIG. 1 is an elevational view showing the glare shield attached to the sun visor with the attachment device of the present invention.

FIG. 2 is an enlarged vertical section taken substantially along the plane of section line 2—2 in FIG. 1 showing the construction of the attachment device and how it attaches the shield to the visor.

FIG. 3 is a section similar to that in FIG. 2 and illustrates a variation of the construction shown in FIG. 2 adapted for padded visors.

FIG. 4 is a plan view illustrating how the shield with the attachment device of the present invention appears as seen with both eyes, when focused on a distant point.

FIG. 5 is an enlarged portion of a section similar to that in FIG. 2 and illustrates a construction in which the outer surface of the abutment member is recessed from the top to form a concave refracting area.

FIG. 6 is an enlarged view of the abutment member from below showing how the outer surface of the abutment member may also be recessed from either end to form a concave refracting area.

FIG. 7 is a horizontal section taken substantially along the plane of section line 7—7 in FIG. 1 and shows how the inside and outside edges of the shield below the bottom edge of the sun visor are beveled to eliminate the images of such edges.

FIG. 8 is a vertical section taken substantially along the plane of section line 8—8 in FIG. 1 and shows how the lower and upper edges of the shield below the bottom edge of the sun visor are beveled to eliminate the images of such edges.

FIG. 9 is a section similar to that in FIG. 2 and illustrates a construction in which the lower and upper edges of the abutment member are beveled to eliminate the images of such edges.

DETAILED DESCRIPTION OF THE FIGURES OF THE DRAWING

Referring more particularly to FIG. 1, the reference numeral 10 therein indicates in general an automobile sun visor such as is standard equipment on motor vehicles. As is conventional, the main body 12 of the sun visor 10 is provided with mounting members 14 and 16 by means of which the sun visor 10 is pivotally attached to the inside of the vehicle for movement between an out-of-the-way position and a substantially vertically dependent position transverse to the direction of the car for the ordinary and well known usage. The glare shield attachment is indicated genearlly by the reference character 18 in FIG. 1, the main body portion of which will be seen to include a base portion 20 with an upper part in face to face contact with the main body 12 of the sun visor and a lower part which extends below the bottom edge 22 of the sun visor as a parallel extension thereof, and also a blade or wing portion 24 extending laterally outward to the car below the bottom edge 22 of the sun visor from the base portion 20, having an upper edge 26 and, in conjunction with the base portion 20, providing a continuous lower edge 28 of the shield. The clip device of the present invention is utilized to attach the glare shield 18 to the main body 12 of the sun visor 10, and preferred forms of such clip construction are shown in FIGS. 2 and 3.

In FIG. 2 an arm 30 extends from the upper side of an abutment member 32 which extends outwardly from the base portion 20 of the shield and has an outer surface 34, the arm 30 being spaced from the opposing surface of the base portion 20 by an amount which is slightly less than the normal thickness of the main body 12 of the sun visor, so as to frictionally engage the shield 18 to the sun visor 10 substantially as shown.

FIG. 3 illustrates a variation adapted for padded visors in which the clip device is contoured to fit the bottom of the main body 12 of the sun visor. In any case, the arms of the clip device, comprising the arm 30 and the opposing part of the base portion 20 of the shield, are positioned laterally so as to hold the shield at or near its center of balance, irrespective of the location of the abutment member 32. This permits the shield to be adjusted and held in the desired angular relationship with reference to the sun visor.

FIG. 4 illustrates in part how the present invention operates. In this figure, the reference numeral 36 shows the image of the abutment member 32 of the clip device when placed in a horizontal position below the bottom edge 22 of the sun visor as seen by the right eye of the operator while looking at a distant point ahead, such image being drawn in a dotted line; while the numeral 38 shows the image of the shield, constructed as preferred with its lower edge 28 parallel to the abutment member, as seen by such right eye, such image being outlined in a fine line. The reference numeral 40 shows the image of said abutment member as seen at the same time by the left eye of the operator, such image being drawn in a bar line; while the numeral 42 shows the image of the shield as seen by such left eye, such image being outlined in a bar-dot line. That area where the images of the shield are superimposed lying below the bottom edge 22 of the sun visor represents the area of total shielding. This area is lightly shaded in FIG. 4. Although considerably longer than required for purely structural purposes, the abutment member 32, under the present invention, is given a horizontal length or transverse extent with respect to the vehicle which is compatible with the interpupillary distance of the operator. Accordingly, the right end of the image 36 will be substantially coincidental with the left end of the image 40, as shown in FIG. 4, devoid of distracting overlap or gap between these images. Thus, a substantially continuous upper frame is presented by the two images blending into each other, as shown in FIG. 4, which is less distracting to the operator than would be the case if the images of the abutment member were either substantially gapping or overlapping in which events there would be the distraction either of two images with space between or of two images joined by a darker appearing area.

Further, under the present invention, the edge 44 of the abutment member 32 inward to the car is spaced from the edge 46 of the base portion 20 of the shield inward to the car by a distance compatible with the interpupillary distance of the operator of the motor vehicle. This has the result, as shown in FIG. 4, of bringing the right end of the image 40 of the abutment member as seen by the left eye of the operator up to and substantially touching the right edge of the image 38 of the shield as seen by the right eye of the operator, so as to blend with it and become unnoticeable. If the right end of the the image 40 were to appear on either side of the right edge of the image 38, there would be distraction on this account.

As used herein, the expression "inward to the car" means in the direction of a vertical plane running through the longitudinal center of the motor vehicle, and the expression "outward to the car" means in the direction away from such vertical plane.

It is noted that the average interpupillary distance of adult persons is about 65 millimeters and that the distance ranges from about 55 millimeters to about 75 millimeters. It has been found that the shield may be constructed with a variation from the interpupillary distance of the operator of about plus or minus 5 millimeters before objectionable deteriorating results are encountered; and, therefore, the practical range for the purposes hereof is between about 50 millimeters and about 80 millimeters.

In addition, by constructing the abutment member 32 of transparent material with an outer surface 34 parallel to the main body portion of the shield below the bottom edge 22 of the sun visor, the abutment member appears to the operator as a transparent window, only slightly darker than the surrounding area of the shield with no distracting variation in light transmittance as compared with the surrounding area of the shield and no distracting distortion of image of a forward object as seen through such surrounding area and the abutment member. This construction, it has been found, eliminates the distraction which occurs when the surface 34 is contoured or is not parallel to the main body portion of the shield below the bottom edge of the sun visor or when the abutment member is opaque. The construction shown in FIG. 3, it will be noted, brings the outer surface 34 of the abutment member 32 closer to the body of the shield than would the construction shown in FIG. 2, thus lessening the depth of the window area.

With the sun visor disposed in a vertical position, overhead traffic lights may be obscured from the view of the operator by the sun visor when the vehicle is close to the traffic light. In an alternative construction adapted for use on highways with overhead traffic lights, the outer surface 34 of the abutment member 32 is recessed inward from the top to form a concave refractive surface which will bring into the view of the operator overhead traffic lights obscured by the sun visor when the vehicle is close to the overhead light. FIG. 5 illustrates such a construction of the outer surface 34. In this figure the reference numeral 48 represents a beam of light emanating from a traffic light situated above an extension 50 of the line of vision from one eye 52 of the operator to the abutment member 32, striking a portion of the outer surface 34, which has been recessed inward from the top to form a concave surface, at a point $p$ on such surface where the angle of incidence is such as to bend the beam 48 so as to pass through the abutment member and the shield to the eye 52.

The above construction may be varied by also recessing the outer surface 34 inward from either end, as shown in FIG. 6, so as to create a concave refractive area which will widen the scope of vision through the abutment member so as to bring into view traffic lights obscured by the visor which otherwise might be to one side of the line of vision through the abutment member. In FIG. 6 the reference numeral 54 represents a beam of light emanating from a traffic light situated to one side of and above an extension 56 of the line of vision from one eye 52 of the operation to the abutment member 32, striking a portion of the outer surface 34, which has been recessed inward from both the top and one end to form a concave surface, at a point $p'$ on such surface where the angle of incidence is such as to bend the beam 54 so as to pass through the abutment member and the shield to the eye 52.

The constructions described in the two preceding paragraphs aid in the use of the shield by enabling the operator to observe traffic signal changes while approaching close to an overhead light or while stopped waiting for a light to change.

If the outer edges of the main body portion of the shield below the bottom edge of the sun visor are left square to the surfaces of such main body portion, two or more of these edges will be apparent to each eye of the operator, regardless of the position of the operator in relation to the shield. These edges can be distracting because of their tendency to show as either illuminated or darkened areas under different light conditions. It has been found that these images can be substantially eliminated by beveling the edges of the shield to make them in line with the eyes of the operator of the motor vehicle when the shield is in normal operating position in relation to the operator. For best results, the left edge is beveled to be in line with the left eye of the operator, the right edge is beveled to be in line with the right eye of the operator, the lower edge is beveled to be in line with the level of the eyes of the operator, and the top edge of the shield below the bottom edge of the sun visor is beveled to be in line with the level of the eyes of the operator. The edge 58 of the shield 18 outward to the car is shown as the left edge of the shield in FIG. 4. It will be noted that the left edge of the area of total shielding, in FIG. 4, is the edge 58 as seen by the left eye of the operator, which makes it preferable to bevel the left edge to the left eye. The edge 58 as seen by the right eye of the operator is to the left of the area of total shielding out of the line of vision and any remaining image of this edge when beveled to be in line with the left eye of the operator is not distracting. Conversely, for similar reasons, the right edge of the shield below the bottom edge of the sun visor is beveled to the right eye of the operator.

FIG. 7 illustrates the beveling of the edge 58 of the shield outward to the car and that part of the edge 46 lying below the bottom edge 22 of the sun visor. The edges 58 and 46 are shown as plane surfaces and as the left and right edges, respectively, of the shield. The line 60 is an extended line drawn from a point p on the edge 58 to the left eye 62 of the operator. The edge 58 is so beveled that the line 60 will pass through the intersections of the edge 58 with both the forward surface 64 and the near surface 66 of the main body portion of the shield 18. Similarly, the line 68 is an extended line drawn from a point p' on that part of the edge 46 below the bottom edge 22 of the sun visor 18 to the right eye 70 of the operator. The edge 46 is so beveled that the line 68 will pass through the intersections of the edge 46 with both the forward surface 64 and the near surface 66 of the main body portion of the shield 18.

FIG. 8 illustrates the beveling of the lower edge 28 of the shield 18 and also the beveling of the upper edge 26 of the blade portion 24. The edges 28 and 26 are shown as plane surfaces. The line 72 is an extended line drawn from a point p on the edge 28 to the central point 74 between the eyes of the operator, such central point representing the level of the eyes of the operator. The edge 28 is so beveled that the line 72 will pass through the intersections of the edge 28 with both the forward surface 64 and the near surface 66 of the main body portion of the shield 18. Similarly, the line 76 is an extended line drawn from a point p' on the edge 26 to the central point 74 between the eyes of the operator. The edge 26 is so beveled that the line 76 will pass through the intersections of the edge 26 with both the forward surface 64 and the near surface 66 of the main body portion of the shield 18.

It has also been found that the upper and lower edges of the abutment member 32 will be apparent to the operator unless they are in line with the eyes of the operator. These images can be eliminated by beveling the said edges of the abutment member to be in line with the level of the eyes of the operator.

FIG. 9 illustrates the beveling of the lower edge 78 and the upper edge 80 of the abutment member 32 so as to eliminate distraction from the images of such edges. The edges 78 and 80 are shown as plane surfaces. The line 82 is an extended line drawn from a point p on the edge 78 to the central point 74 between the eyes of the operator. The edge 78 is so beveled that the line 82 will pass through the intersections of the edge 78 with both the outer surface 34 of the abutment member and the forward surface 64 of the main body portion of the shield 18. Similarly, the line 84 is an extended line drawn from a point p' on the edge 80 to the central point 74 between the eyes of the operator. The edge 80 is so beveled that the line 84 will pass through the intersections of the edge 80 with both the inner surface 86 of the arm 30 and the forward surface 64 of the main body portion of the shield 18.

The edges of the abutment member inward and outward to the car may also be beveled so as to eliminate distraction from the images of such edges. If the left edge is beveled to be in line with the left eye of the operator and the right edge is beveled to be in line with the right eye of the operator, the images of such edges will be eliminated at the point of junction of the separate images of the abutment member as seen by each eye of the operator while looking at a distant point ahead. On the other hand, if the left edge is beveled to be in line with the right eye, and the right edge is beveled to be in line with the left, the images of such edges will be eliminated at the outward and inward extremities of the combined image but not at the point of junction of the separate images.

For the purposes hereof, a shield is in normal operating position in relation to the operator of the motor vehicle when:

(1) The shield is attached to the sun visor, disposed in a vertical of substantially vertical position so that the main body portion of the shield below the bottom edge of the sun visor is at an angle ranging from about 30 degrees forward to about 30 degrees backward of a true vertical position.

(2) The lower edge 28 of the shield is in a horizontal position, (3) The central point between the eyes of the operator of the motor vehicle is at the same height as the center of the shield below the bottom edge of the sun visor, (4) The distance between the central point between the eyes of the operator and the center of the shield below the bottom edge of the sun visor is between about 18 centimeters and about 56 centimeters, and (5) A line drawn from the central point between the eyes of the operator to the center of the shield below the bottom edge of the sun visor will be perpendicular to a line drawn through the center of the shield below the bottom edge of the sun visor parallel to the lower edge of the shield.

As used herein, the following words and expressions have the following meaning: (i) a line drawn to an "eye" of the operator means a line drawn to the pupil of such eye of the operator; (ii) "in line with" an "eye," "the eyes" or "the level of the eyes" of the operator means in line with the pupil, pupils or the level of the pupils, respectively, of such eye or eyes of the operator; (iii) "between the eyes of the operator" means between the pupils of the eyes of the operator; (iv) "center of the shield below the bottom edge of the sun visor" means the geometrical center of the shield below the bottom edge of the sun visor; (v) "forward surface of the main body portion of the shield" means the surface of the main body portion of the shield, exclusive of edges, farthest from the operator of the motor vehicle; and (vi) "near surface of the main body portion of the shield" means the surface of the main body portion of the shield, exclusive of edges, nearest to the operator of the motor vehicle.

It has been found that for practical purposes the overall length of the shield as measured by the length of the lower edge 28 should not be less than about 150 millimeters nor more than about 250 millimeters and that the width of the blade portion 24 should not be less than about 25 millimeters nor more than about 50 millimeters. Within these limits and also within (i) the limits in the variation from the perpendicular of the disposition of the shield and the limits in the distance of the eyes of the operator from the shield as set forth in the definition of normal operating position of a shield in relation to the operator of the motor vehicle, above, and (ii) the limits of interpupillary spacing of between about 55 millimeters and about 75 millimeters, the range of beveling angles required for the various edges of the shield easily can be determined.

The edge 58 of the shield outward to the car, in order to be in line with the laterally corresponding eye of the operator, should be beveled so that the angle between the near surface 66 of the main body portion of the shield and the extended plane of the edge 58 is not more than about 86 degrees nor less than about 62 degrees.

That part of the edge 46 of the base portion of the shield inward to the car lying below the bottom edge of the sun visor, in order to be line with the laterally corresponding eye of the operator, should be beveled so that the angle between the near surface 66 of the main body portion of the shield and the extended plane of the said part of the edge 46 is not more than about 86 degrees nor less than about 62 degrees.

The lower edge 28 of the shield, in order to be in line with the level of the eyes of the operator, should be beveled so that the angle between the near surface 66 of the main body portion of the shield and the extended plane of the edge 28 is not less than about 54 degrees nor more than about 119 degrees.

The upper edge 26 of the blade portion 24, in order to be in line with the level of the eyes of the operator, should be beveled so that the angle between the near surface 66 of the shield and the extended plane of the edge 28 is not more than about 119 degrees nor less than about 54 degrees.

The lower edge 78 of the abutment member 32, in order to be in line with the level of the eyes of the operator, should be beveled so that the angle between the forward surface 64 of the main body portion of the shield and the plane of such edge is not less than about 54 degrees nor more than about 119 degrees; while the upper edge 80 of the abutment member, in order to be in line with the level of the eyes of the operator, should be beveled so that the angle between the forward surface 64 of the main body portion of the shield and the plane of such edge is not more than about 119 degrees nor less than about 54 degrees.

A preferred embodiment of the shield would include a main body portion of transparent glare reducing sheet material approximately one-eighth inch thick having its lower edge 28 approximately 240 millimeters long with the side edges 46 and 58 at approximately right angles to the lower edge 28.

The blade portion 24 would be approximately 110 millimeters long with its upper edge 26 generally parallel to the lower edge 28 of the shield and space approximately 40 millimeters therefrom.

The abutment member 32 would be made of transparent material and would have a length of approximately 65 millimeters. It would be attached to the forward surface 64 of the main body portion of the shield so that the upper edge 80 of the abutment member would be approximately parallel to the lower edge 28 of the shield and would also be approximately on line with the upper edge 26 of the blade portion 24. The inward edge 44 of the abutment member would be spaced a distance of approximately 65 millimeters from the inward edge 46 of the base portion 20 of the shield.

The outer surface 34 of the abutment member would be a plane surface parallel to the forward surface 64 of the main body portion of the shield. The end edge 44 of the abutment member inward to the car would be a plane surface meeting the surface 64 on a line perpendicular to the lower edge 28 of the shield and would form an angle of approximately 87 degrees with the surface 64. The other end edge of the abutment member would be a plane surface parallel to the edge 44.

The edge 58 of the shield outward to the car and that part of the edge 46 below the bottom edge of the sun visor would be beveled so that the angle between the near surface 66 of the main body portion of the shield and the extended plane of the edge 58, and also the angle between the near surface 66 and the extended plane of said part of the edge 46, would be about 77 degrees.

The lower edge 28 of the shield would be beveled so that the angle between the near surface 66 and the extended plane of the edge 28 would be about 77 degrees.

The upper edge 26 of the blade portion 24 would be beveled so that the angle between the near surface 66 and the extended plane of the edge 26 would be about 97 degrees.

The upper edge 80 of the abutment member 32 would be beveled so that the angle between the forward surface 64 and the plane of such edge would be about 97 degrees.

The lower edge 78 of the abutment member 32 would be approximately parallel to the upper edge 80 of the abutment member and would be spaced approximately 4 millimeters therefrom.

The foregoing embodiment presumes a distance of 36 centimeters from the eyes of the operator to the shield a forward tilt of the shield of 10 degrees and an interpupillary distance of the operator of 65 millimeters.

The improvements described above will promote highway safety by aiding in the operation of the shield, thereby enabling it more effectively to reduce the dangers of driving caused by glare.

I claim:

1. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a clip device for attaching the shield to the sun visor including an abutment member extending outwardly from the body of the shield below the bottom edge of the sun visor, said abutment member having a horizontal length compatible with the interpupillary spacing of the operator of the motor vehicle and lying between about 50 millimeters and about 80 millimeters, so that the images of said abutment member, as seen by the separate eyes of the operator, will appear as contiguous images substantially devoid of distracting gap or overlap, the outer surface of said abutment member being recessed inward from the top so as to form a concave outer surface portion through which the operator of the motor vehicle may see images above an extension of the line of vision from one eye of the operator to such portion.

2. In an automobile glare shield having a body of glare reducing sheet material fastened to an automobile sun visor, disposed substantially vertically and provided with a transversely extending substantially horiontal lower edge, so as to extend below the bottom edge of the sun visor as an extension thereof, a clip device for attaching the shield to the sun visor including an abutment member extending from the body of the shield longitudinally with respect to the motor vehicle below the bottom edge of the sun visor, the inner edge of said abutment member with respect to the longitudinal center line of the motor vehicle being spaced from the inner edge of the shield a distance compatible with the interpupillary spacing of the operator of the motor vehicle and lying between about 50 millimeters and about 80 millimeters so that the image of said inner edge of the abutment member as seen by one eye of the operator will be substantially coincidental with the image of said inner edge of the shield as seen by the other eye of the operator, the outer surface of said abutment member being recessed inward from the top so as to form a concave outer surface portion through which the operator of the motor vehicle may see images above an extension of the line of vision from one eye of the operator to such portion.

3. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a clip device for attaching the shield to the sun visor including an abutment member of transparent material extending outwardly from the body of the shield below the bottom edge of the sun visor, the outer surface of said abutment member being recessed inward from the top so as to form a concave outer surface portion through which the operator of the motor vehicle may see images above an extension of the line of vision from one eye of the operator to such portion.

4. The construction described in claim 3 in which the outer surface of the abutment member is also recessed inward from an end so as to form a concave outer surface portion through which the operator of the motor vehicle may see images abve and to one side of an extension of the line of vision from one eye of the operator to such portion.

5. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a main body portion below the bottom edge of the sun visor having a substantially straight outward side edge portion beveled so that an extension of the plane defined by such side edge portion substantially passes through a pupil of the operator of the motor vehicle.

6. The glare shield according to claim 5 wherein the angle between the extension of the plane defined by said substantially straight outward side edge portion and the near surface of the main body portion of the shield is not more than about 86 degrees nor less than about 62 degrees.

7. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a main body portion below the bottom edge of the sun visor having a substantially straight inward side edge portion beveled so that an extension of the plane defined by such side edge portion substantially passes through a pupil of the operator of the motor vehicle.

8. The glare shield according to claim 7 wherein the angle between the extension of the plane defined by said substantially straight inward side edge portion and the near surface of the main body portion of the shield is not more than about 86 degrees nor less than about 62 degrees.

9. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a main body portion below the bottom edge of the sun visor having a substantially straight, substantially horizontal lower edge portion beveled so that an extension of the plane defined by such lower edge portion substantially passes through the pupils of the operator of the motor vehicle.

10. The glare shield according to claim 9 wherein the angle between the extension of the plane defined by said substantially straight substantially horizontal lower edge portion and the near surface of the main body portion of the shield is not less than about 54 degrees nor more than about 119 degrees.

11. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a main body portion below the bottom edge of the sun visor having a substantially straight substantially horizontal upper edge portion beveled so that an extension of the plane defined by such upper edge portion substantially passes through the pupils of the operator of the motor vehicle.

12. The glare shield according to claim 11 wherein the angle between the extension of the plane defined by said substantially straight substantially horizontal upper edge portion and the near service of the main body portion of the shield is not more than about 119 degrees nor less tha nabout 54 degrees.

13. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a clip device for attaching the shield to the sun visor including an abutment member extending outwardly from the main body portion of the shield below the bottom edge of the sun visor, said abutment member having a substantially straight substantially horizontal lower edge portion beveled so that an extension of the plane defined by such lower edge portion substantially passes through the pupils of the operator of the motor vehicle.

14. The glare shield according to claim 13 wherein the angle between the plane defined by said substantially straight substantially horizontal lower edge portion and the main body portion of the shield is not less than about 54 degrees nor more than about 119 degrees.

15. In an automobile glare shield having a body of glare reducing sheet material fastened to an automobile sun visor, disposed substantially vertically and provided with a transversely extending substantially horizontal lower edge, so as to extend below the bottom edge of the sun visor as an extension thereof, a clip device for attaching the shield to the sun visor including an abutment member extending outwardly from the main body portion of the shield below the bottom edge of the sun visor, said abutment member having a substantially straight substantially horizontal upper edge portion beveled so that an extension of the plane defined by such upper edge portion substantially passes through the pupils of the operator of the motor vehicle.

16. The glare shield according to claim 15, wherein the angle between the plane defined by said substantially straight substantially horizontal upper edge portion and the main body portion of the shield is not more than about 119 degrees nor less than about 54 degrees.

References Cited
UNITED STATES PATENTS

| | | | |
|---|---|---|---|
| 1,637,309 | 7/1927 | David | 296—97 |
| 3,038,756 | 6/1962 | Heimer. | |
| 3,195,946 | 7/1965 | Van Sickle | 296—97 |
| 3,356,439 | 12/1967 | Magnus | 351—44 |

LEO FRIAGLIA, Primary Examiner

J. A. PEKAR, Assistant Examiner